United States Patent [19]

Essert et al.

[11] Patent Number: 5,121,456
[45] Date of Patent: Jun. 9, 1992

[54] POLYMER SPRING FIBER OPTIC SPLICER, TOOL FOR OPERATING SAME AND PANEL INCORPORATING SAME

[75] Inventors: Robert Essert, Glen Ellyn; Peter Ori, Chicago, both of Ill.

[73] Assignee: Reliance Comm/Tec Corporation, Chicago, Ill.

[21] Appl. No.: 579,127

[22] Filed: Sep. 6, 1990

[51] Int. Cl.⁵ .............................................. G02B 6/38
[52] U.S. Cl. ...................................... 385/70; 385/134; 385/136
[58] Field of Search ................ 350/96.2, 96.21, 96.22; 385/70, 134, 135, 136

[56] References Cited

U.S. PATENT DOCUMENTS

| | | | |
|---|---|---|---|
| 4,029,390 | 6/1977 | Chinnock et al. | 350/96 |
| 4,274,708 | 6/1981 | Cocito et al. | 350/96 |
| 4,279,468 | 7/1981 | Turley et al. | 350/96.21 |
| 4,391,487 | 7/1983 | Melman et al. | 350/96 |
| 4,435,038 | 3/1984 | Soes et al. | 350/96 |
| 4,593,971 | 6/1986 | Clement et al. | 350/96 |
| 4,634,216 | 1/1987 | Calevo et al. | 350/96.21 |
| 4,729,619 | 9/1988 | Blomgren | 350/96 |
| 4,784,460 | 11/1988 | Khoe | 350/96.21 |
| 4,818,058 | 4/1989 | Bonanni | 350/96.2 |
| 4,824,197 | 4/1989 | Patterson | 350/96 |
| 4,913,508 | 4/1990 | Blyler, Jr. et al. | 350/96.16 |
| 4,921,323 | 5/1990 | Delahanty et al. | 350/96 |
| 4,929,046 | 5/1990 | Barlow | 350/96.21 |
| 4,930,859 | 6/1990 | Hoffman, III | 350/96.21 |

OTHER PUBLICATIONS

Thirty-Seventh International Wire and Cable Symposium, "Mechanical Optical Fiber Splice Containing an Articulated Conformable Metallic Element", Richard A. Patterson, Nov. 1988.

Primary Examiner—John D. Lee
Assistant Examiner—John Ngo
Attorney, Agent, or Firm—Trexler, Bushnell, Giangiorgi & Blackstone, Ltd.

[57] ABSTRACT

A splicer for optical fibers. The splicer is assembled from two polymer body halves. When assembled the body halves function as spring clamps. Internal to the body halves is a metallic splice element which is assembled from two mirror image halves. The polymer body halves and the metallic splice element body halves both include a passageway for the two fibers to be spliced and a passageway for a tool that is used to operate the splicer so that a fiber can be inserted into or removed therefrom. During assembly a portion of the body halves are fused together to provide a unitized construction to the spring clamps. The splicer may be inserted in a panel. A ferrule is used to hold the splicer in the panel.

34 Claims, 7 Drawing Sheets

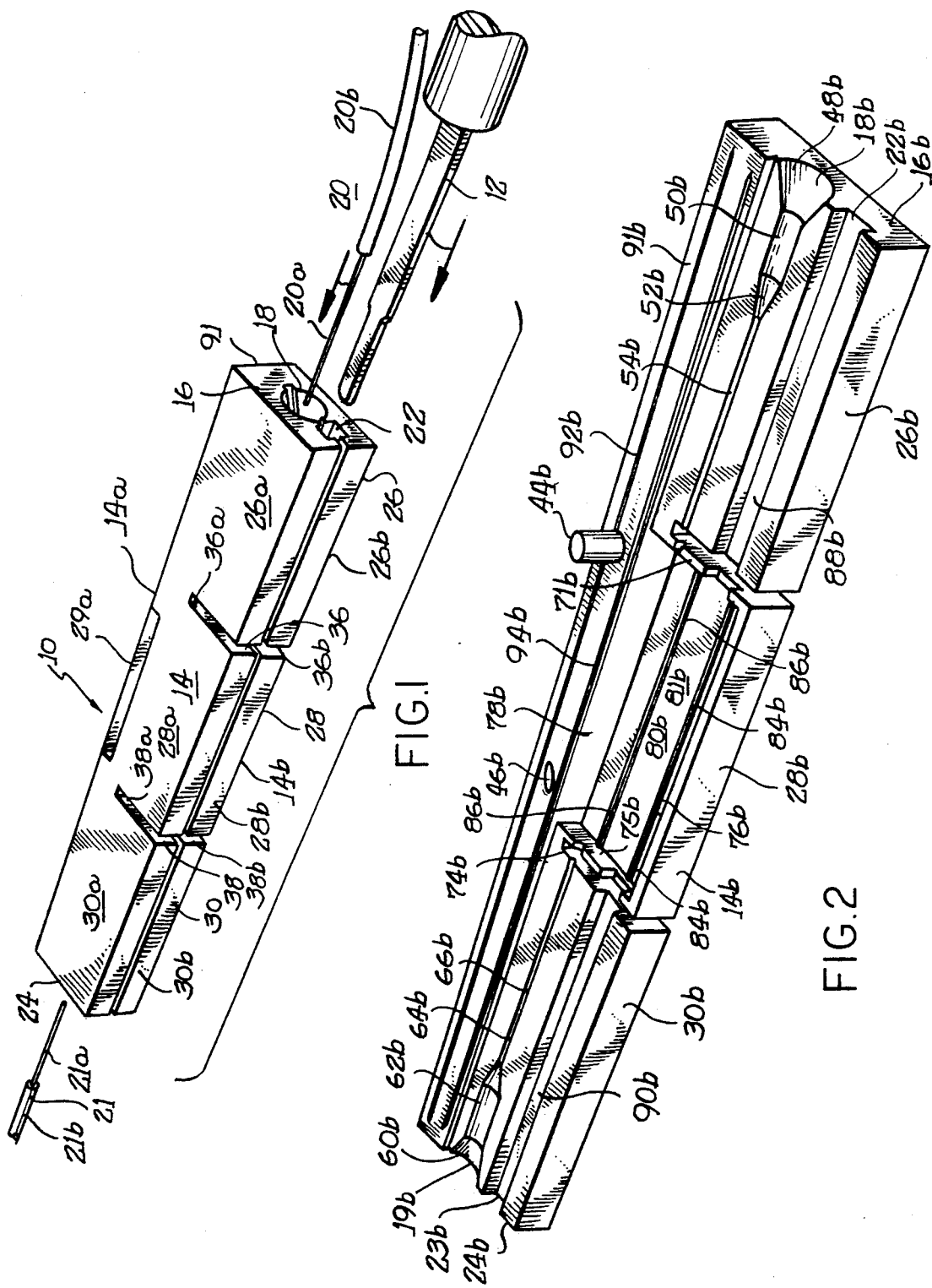

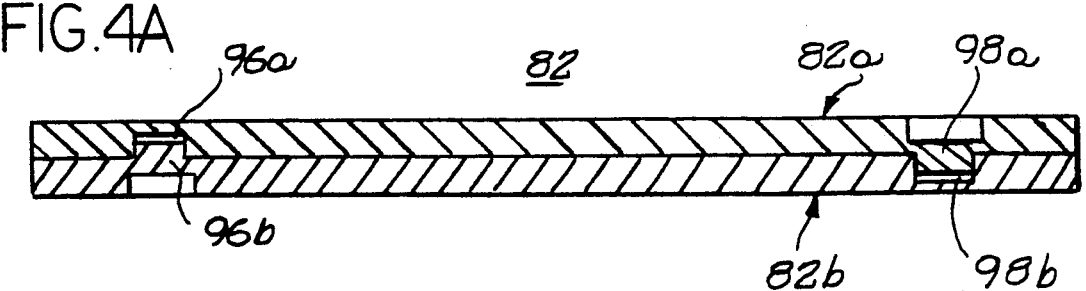
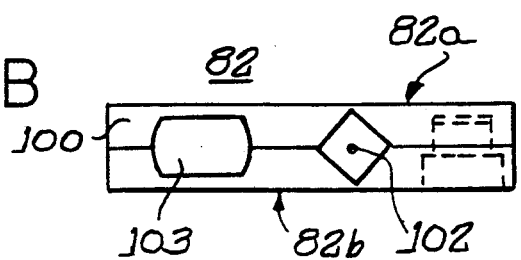
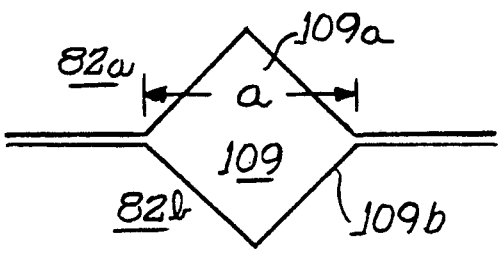
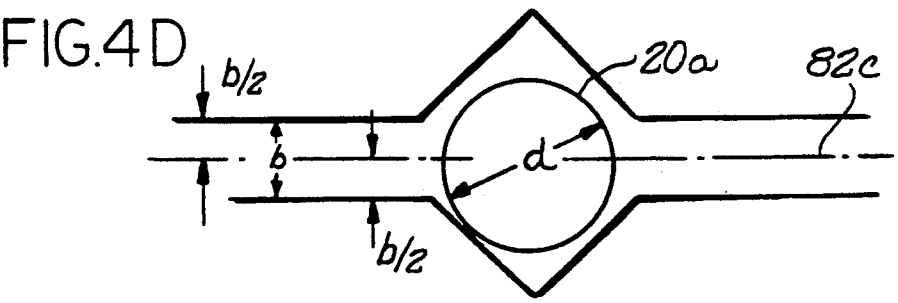
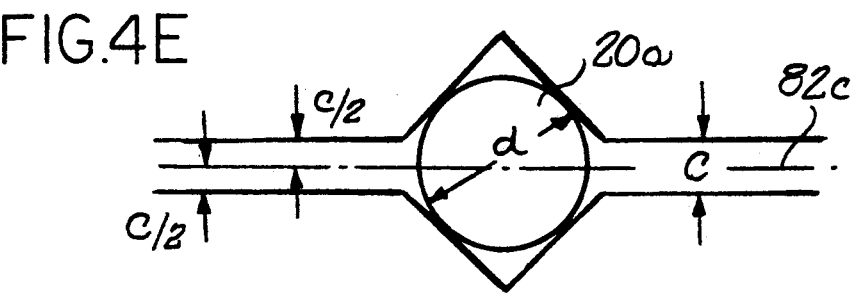

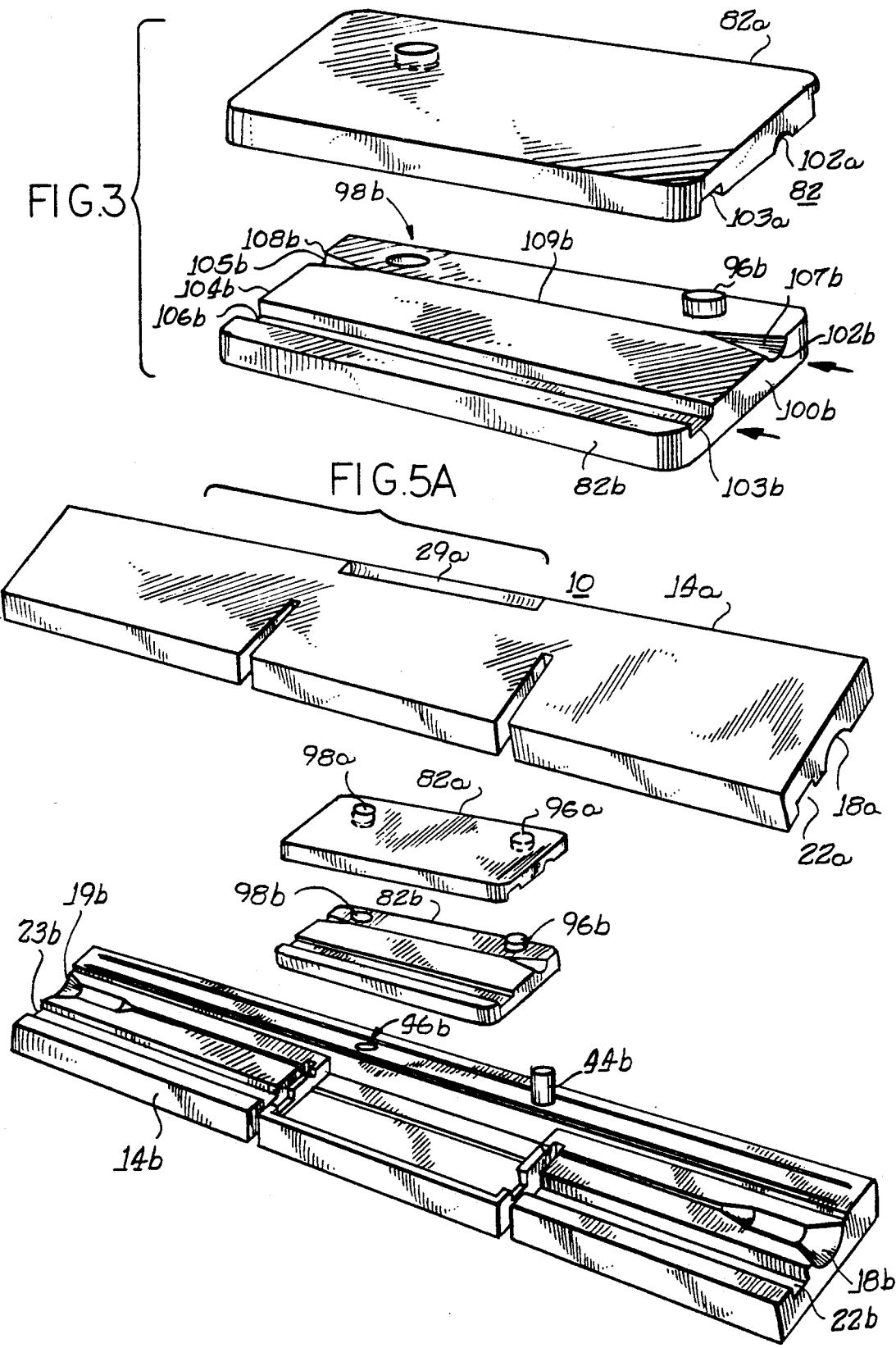

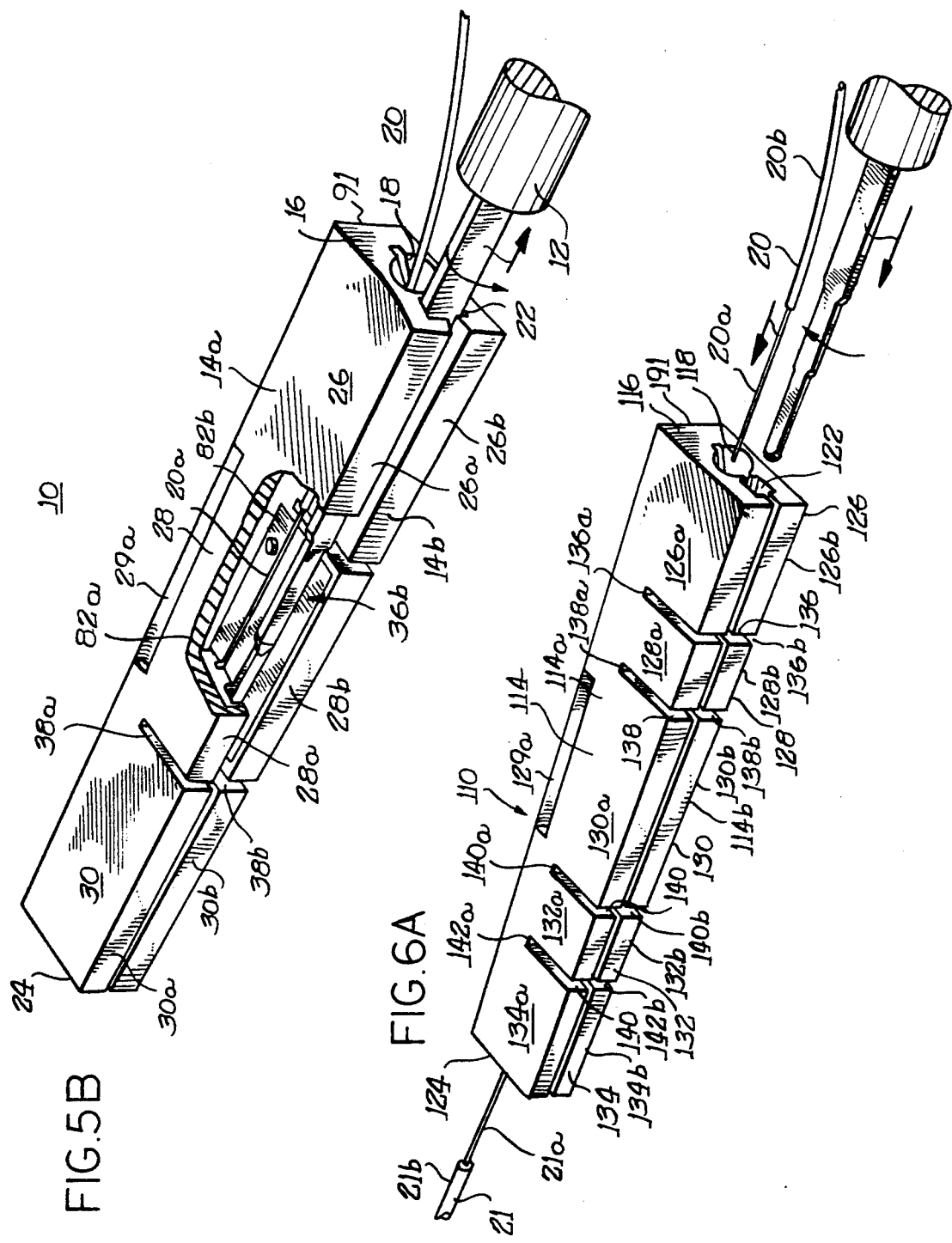

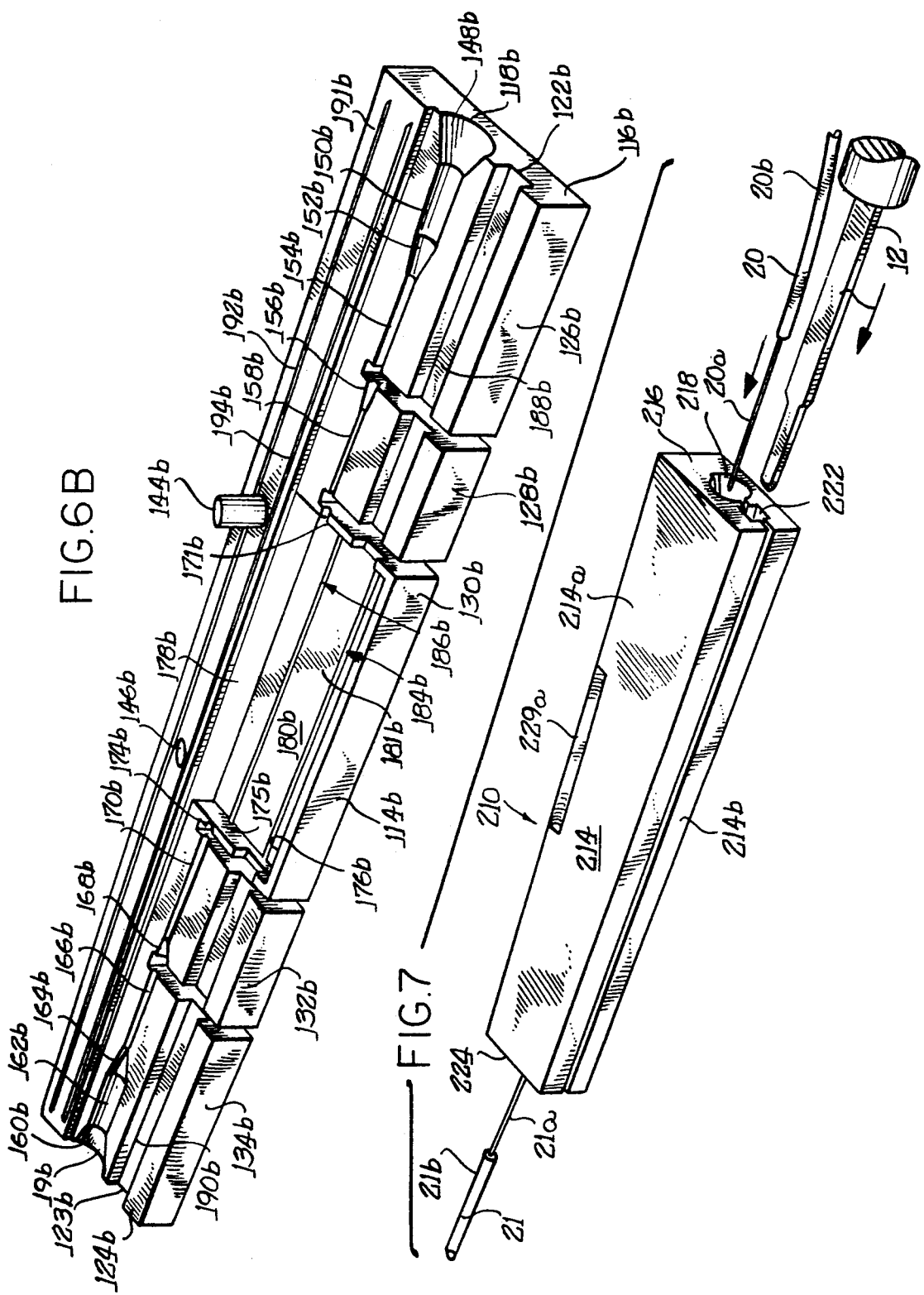

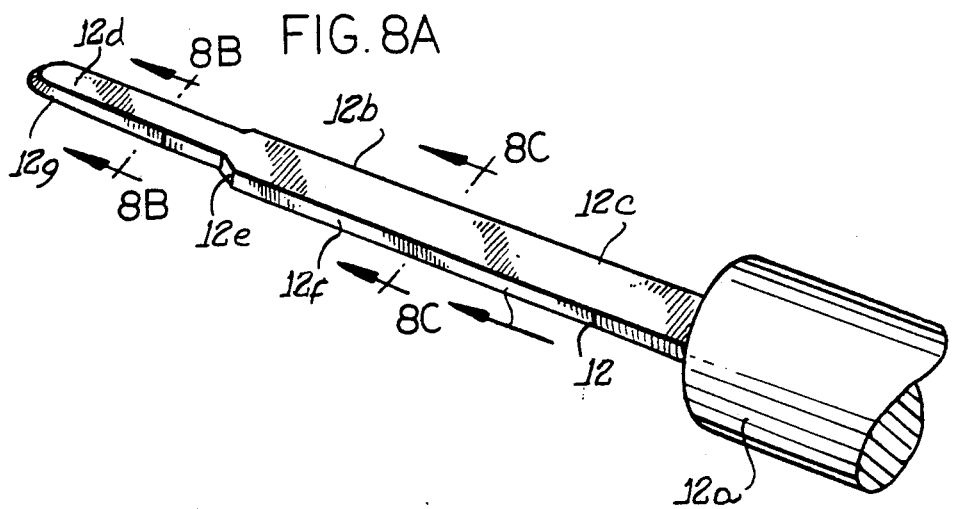
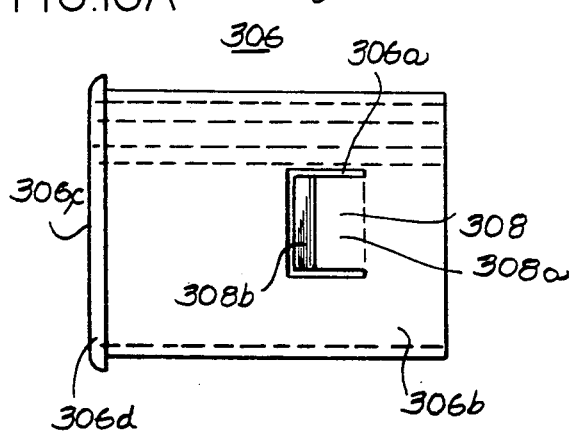
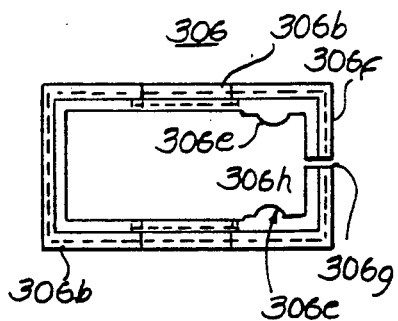
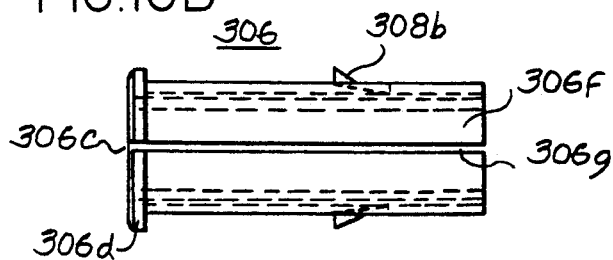

POLYMER SPRING FIBER OPTIC SPLICER, TOOL FOR OPERATING SAME AND PANEL INCORPORATING SAME

BACKGROUND OF THE INVENTION

1. Field of the Invention

This invention relates to devices for splicing optical fibers (hereinafter "splicers") and more particularly to such a splicer which provides improved optical fiber entry, self centering and holding to afford the splicing of and alignment of ends of the optical fibers to be spliced.

2. Description of the Prior Art

The art is becoming replete with devices for splicing optical fibers. In such devices the two fibers to be spliced are centered for the purpose of aligning the ends of the fibers. The optical fiber used in the telecommunications industry is mostly a single mode fiber. This fiber typically contains a 8 um±1 um diameter central glass core through which the optical signal is transmitted. The core is surrounded by a glass cladding which has a diameter of 125 um±3 um. The cladding has a slightly different index of refraction than the core.

There are a number of prior art devices which have been designed to make permanent connections or splices in single mode glass fibers. To function properly and produce a low loss splice, all of these devices must align the core portions of the two fibers being spliced to within approximately 10% of their core diameter or less than 1 um.

Some of the prior art devices have non-conformable "V" grooves or non-conformable rods. The fibers to be end centered and aligned are forced into the groove or between the rods. These devices, examples of which are shown in U.S. Pat. Nos. 4,029,390; 4,274,708 and 4,729,619, function satisfactorily as long as the fibers being spliced have the same diameter.

As described above the nominal cladding diameter of 125 um has a tolerance range whose ends are at 122 um and 128 um. When the cladding diameters of the fibers to be spliced are at the opposite ends of the tolerance range the non-conformable "V" groove type devices have difficulty in providing the required core alignment precision.

Others of the prior art devices have three equally spaced ductile or elastomeric surfaces which create an equilateral triangular cross-sectional channel into which the fibers to be spliced are positioned The fiber ends are located between the three equally spaced surfaces. Usually the midpoint of the channel is where the junction between the ends of the two fibers is located. These devices, examples of which are disclosed in U.S. Pat. Nos. 4,391,487; 4,435,038; and 4,593,971 are better suited to accommodate differences in fiber cladding diameter than the non-conformable devices described above.

U.S. Pat. No. 4,824,197 discloses a stamped lightguide interconnect centering element for splicing. After stamping, that element is folded which may introduce various distortions such as internal stresses and variation in the grain of the material used in the element. That device utilizes the well known three equally spaced contact surfaces to form a fiber centering channel. The fiber clamping surfaces are initially spaced far enough apart to allow fibers to be inserted. When the fiber ends have been inserted and it has been determined that they are in contact the splice element, which is seated in a jacket, is closed by pushing a cap into the jacket. The pushing of the cap requires that the craftsperson operate the handle of an assembly tool which requires either that one hand be removed from the fibers or another craftsperson is available to operate the tool.

U.S. Pat. No. 4,921,323 discloses a splicer developed from memory polymers. After the ends of the fibers are inserted the mass is exposed to a stimulus such as heat which causes the mass to recover its inherent shape.

It is desirable that the splicer be relatively easy to manufacture and assemble. It is also desirable that at least the splice element of the splicer use identical stamped or molded parts which then have mirror image characteristics. The use of such parts ensures uniform clamping of the fiber cladding. It is also further desirable that the splicer clamp both the cladding and buffer of a fiber inserted therein. It is further desirable that the splicer be sold completely assembled. This prevents the possible loss of critical parts by the user of the splicer. It is further desirable that the splicer be relatively easy to use and that the same tool be usable with all of the splicers.

It is still further desirable that each of the two fibers to be spliced can be inserted in each end of the splicer independently of each other and without disturbing a fiber that has already been inserted in the one of the ends. This allows one craftsperson to insert the fibers and also allows one craftsperson to reenter the splicer for the purpose of removing one of the fibers for repair or replacement without disturbing the other fiber.

The independent insertion of the fibers allows the splicer of the present invention to be mounted in panels in relatively high densities. All of the fibers on one side of the panel can be inserted in the associated one of the splicers without disturbing any fibers that may have been inserted on the other side. Those other side fibers, if not already inserted in the splicer panel, can be inserted by the same craftsperson who inserted the fibers in the one side splicers without disturbing those inserted fibers. Alternatively, the insertion of those other side fibers can be left for a later time or even another craftsperson.

SUMMARY OF THE INVENTION

A splicer for at least two optical fibers. The splicer has a housing which has at least two openings each of which are associated with one of the at least two optical fibers and at least one double cantilever spring. A fiber receiving and positioning channel is in the housing and extends between the at least two openings. The spring is for clamping both the buffer and cladding of the at least two fibers when each one of the fibers are in the fiber receiving and positioning channel from the associated one of the openings to a point which is about halfway between the openings. The clamping for each of the fibers is independent of each other.

An element for use in splicing at least two optical fibers. The element is formed from two mirror image halves each of which has a fiber supporting surface having two common longitudinal planes at an angle with respect to each other which is essentially ninety degrees. Each mirror image half also has half of a means for spreading the splice element so that a fiber can be moved in the element.

A method for assembling a fiber optic splicer. The splicer comprises a splice element which has first and second mirror image body halves and first and second outside body halves each of which has a recess for receiving the splice element. The method comprises the steps of assembling the first and second splice element body halves to form the splice element, placing the splice element in the recess of one of the first and second outside body halves, assembling the first and second outside body halves to form the splicer and fusing predetermined portions of the first and second body halves to each other.

A ferrule for use with a splicer for optical fibers so that the splicer can be inserted in an opening of a panel which has two faces. The splicer has a central portion of predetermined shape and the panel opening has a shape which is essentially complementary to the predetermined shape. The ferrule comprises a body which has essentially the predetermined shape and an aperture for receiving the splicer central portion. The aperture has a predetermined shape which is essentially complementary to the splicer predetermined shape. The ferrule further comprises means on the body for positively engaging one face of the panel when the ferrule is inserted in the panel opening.

A method for operating a splicer for at least two optical fibers. The splicer comprises a housing which has at least two openings each associated with one of the fibers and at least one cantilever spring. The splicer also comprises a fiber receiving and positioning channel in the housing extending between the two openings. The spring is for clamping both the buffer and cladding of the at least two fibers when each one are in the channel from the associated one of the two openings to a point in the housing which is about halfway between the openings. The clamping for each of the fibers is independent of each other. The method comprises the steps of forcing the spring to deflect between one of the openings and the about halfway point and moving the associated one of the fibers in the fiber receiving and positioning channel.

DESCRIPTION OF THE DRAWING

FIG. 1 shows one embodiment for the splicer of the present invention, including the tool for use therewith.

FIG. 2 shows one of the two rectangularly shaped body halves for the splicer of FIG. 1.

FIG. 3 shows the metal splice element which is included in the splicer of FIG. 1 prior to assembly.

FIG. 4a shows a section through the assembled metal splice element of FIG. 3.

FIG. 4b shows an end view of the assembled metal splice element.

FIGS. 4c, 4d and 4e are enlargements of a section through the assembled metal splice element showing the equilateral diamond shaped groove of the splice element when no fiber has been inserted, after the splicer has been opened to receive a fiber and after the splicer has received a fiber and been closed to lock the fiber in place, respectively.

FIG. 5a shows an exploded perspective of the splicer of FIG. 1 prior to assembly.

FIG. 5b shows the splicer of FIG. 1 with a portion of the top half cut away so as to show the operation of the splicer to receive into it or remove from it a fiber.

FIGS. 6a and 6b show a second embodiment for the splicer of the present invention as well as one of the body halves thereof, respectively, including the tool for use therewith.

FIG. 7 shows a third embodiment for the splicer of the present invention.

FIG. 8a shows the tool or use with the splicer of FIG. 1. FIGS. 8b and 8c show sections through the shaft portion of the tool of FIG. 8a.

FIGS. 10a, 10b and 10c, show various views of the ferrule associated with each splicer used in the panel of FIG. 9.

DESCRIPTION OF THE PREFERRED EMBODIMENTS

Figure 9:
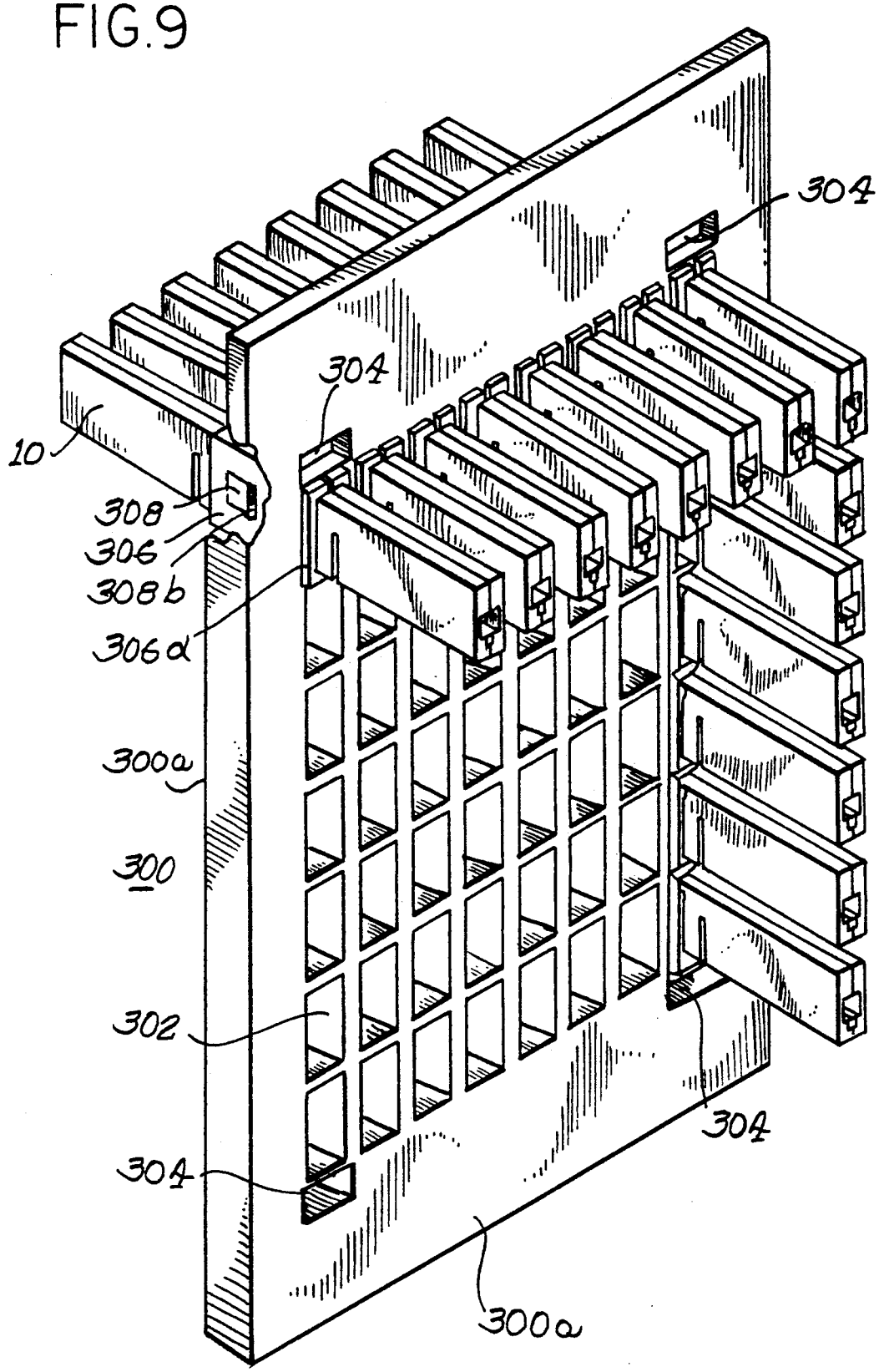
FIG. 9 shows a panel which is capable of holding a multiplicity of the splicers of FIG. 1.

Referring now to FIG. 1 there is shown the fully assembled polymer spring splicer 10 of the present invention and the tool 12 for operating the same. The splicer 10 has a rectangularly shaped polymer body 14 which is constructed in the manner to be described in detail below from mirror image rectangularly shaped polymer body halves 14a and 14b, one of which is shown in FIG. 2. At first end 16 of body 14 there is a first essentially rectangularly shaped aperture 18 for receiving a buffered optical fiber 20 to be spliced. End 16 also includes a second essentially rectangularly shaped aperture 22 for receiving tool 12. Body 14 also includes a second end 24 which also has a first essentially rectangularly shaped aperture 19 (not shown in FIG. 1) identical to aperture 18 for receiving the buffered optical fiber 21 to be spliced to fiber 20. Second end 24 also has a second essentially rectangularly shaped aperture 23 (not shown in FIG. 1) identical to aperture 22 for receiving tool 12. Half of apertures 19 and 23 are shown in FIG. 2.

As is shown in FIG. 1 each half 14a, 14b of body 14 is divided into the three sections 26a, 28a and 30a of body half 14a and the three sections 26b, 28b and 30b of body half 14b. Each of the sections are separated from the next adjacent section by the associated one of elongated U-shaped gaps 36a and b, and 38a and b. Gaps 36a and b separate sections 26a and b, and 28a and b; and gaps 38a and b separate sections 28a and b, and 30a and b.

As will be described in more detail hereinafter in assembled splicer 10 sections 26a, 26b and 28a, 28b of body halves 14a and 14b function as double cantilever spring clamps 26 and 28, respectively, to retain buffered fiber 20 after it is received in aperture 18. More specifically, spring clamp 28 retains the cladding 20a of fiber 20 while spring clamp 26 retains the buffer 20b of that fiber. In an identical fashion sections 28a, 28b and 30a, 30b of body halves 14a and 14b function in the assembled splice as double cantilever spring clamps 28 and 30, respectively, to retain the buffered fiber 21 received in aperture 19 of end 24. More specifically spring clamp 28 retains the cladding 21a of fiber 21 while spring clamp 30 retains the buffer 21b of that fiber.

Also as will be described in more detail hereinafter tool 12 is used to open spring clamps 26 and 28 so that fiber 20 can be received in or removed from aperture 18 in end 16. In order for the opening of those spring clamps to be accomplished, the tool is inserted in essentially rectangularly shaped aperture 22 and rotated in one direction so as to deflect the two sections comprising each spring clamp, i.e. the arms of the double cantilever spring clamps. Thereafter, the tool remains in position without any need for force to be applied to maintain it in place. Fiber 20 can then be received in or removed from aperture 18. At the end of that operation the tool is rotated in the opposite direction and withdrawn from the aperture 18. It should be appreciated that the length of tool 20 is such that the tool only projects inwardly into housing 14 a distance sufficient to open only spring clamps 26 and 28 and not to affect any fiber that may have been received in the associated one of the apertures in end 24 and is held in place in splicer 10 by clamps 28 and 30.

In a similar manner tool 12 is inserted in the essentially rectangularly shaped aperture 23 in end 24 and rotated in the one direction so that a fiber can be received in or removed from aperture 19. As described above the length of tool is such as to only open spring clamps 28 and 30 and not to affect any fiber that may have been received in aperture 18 and is held in place in splicer 10 by clamps 26 and 28. At the end of that operation the tool is rotated in the opposite direction and withdrawn from aperture 23. Therefore using only one hand a craftsperson can spread those of the spring clamps of splicer 10 associated with one of the fibers and with that hand or the other hand either insert into or remove from those spring clamps that fiber without disturbing a fiber that has been received in the spring clamps associated with that other fiber.

Referring now to FIG. 2 there is shown one of the rectangularly shaped body halves 14$b$ of body 14. As described above the body halves are mirror images of each other and when mated together form apertures 18, 19, 22 and 23. Therefore only the half of those apertures 18$b$, 19$b$ in end 16$b$ and the half of those apertures 22$b$, 23$b$ in end 24$b$ of body half 14$b$ are shown in FIG. 2. In addition, only one of the body halves 14$b$ need be described in detail it being understood that the other body half 14$a$ is identical in construction to body half 14$b$.

Body half 14$b$ includes upwardly projecting alignment boss or pin 44$b$ and complementary alignment hole or opening 46$b$. When polymer body halves 14$a$ and 14$b$ are mated together during the assembly of splicer 10 the alignment boss or pin 44$b$ on body half 14$b$ interferes with the complementary alignment hole or opening 46$a$ on body half 14$a$. Opening 46$b$ on body half 14$b$ interferes with the pin 44$a$ on body half 14$a$.

Starting at aperture 18$b$, section 26$b$ has a first tapered half rectangularly shaped portion 48$b$ which is followed by a first half rectangularly shaped portion 50$b$. When splicer 10 is assembled from body halves 14$a$ and 14$b$ and spring clamp 26 is closed, half rectangularly shaped portion 50$b$ in combination with half rectangularly shaped portion 50$a$ of body half 14$a$ defines an elongate rectangularly shaped channel 50 whose height is sufficient to hold in place a 900 um buffer 20$b$. Following half rectangularly shaped portion 50$b$, section 26$b$ has a second tapered half rectangularly shaped portion 52$b$. A second half rectangularly shaped portion 54$b$ starts at the left hand end of portion 52$b$ and ends at gap 36$b$. When splicer 10 is assembled and spring clamp 26 is closed, half rectangularly shaped portion 54$b$ in combination with half rectangularly shaped portion 54$a$ of body half 14$a$ defines an elongated rectangularly shaped channel 54 whose height is sufficient to hold in place a 250 um buffer 20$b$.

In a similar manner, section 30$b$ has first and second tapered half rectangularly shaped portions 60$b$ and 64$b$ and first and second half rectangularly shaped portions 62$b$ and 66$b$. When splicer 10 is assembled and spring clamp 30 is closed, half rectangularly shaped portions 62$b$ and 66$b$ in combination with half rectangularly shaped portions 62$a$ and 66$a$ of body half 14$a$ define elongated rectangularly shaped channels 62 and 66, respectively, whose heights are sufficient to hold in place a 900 um and a 250 um buffer 21$b$, respectively.

Section 28$b$ includes in the top ledge of its relatively thin right hand wall 71$b$ a first tapered half rectangularly shaped portion 72$b$ which starts at gap 36$b$ and ends at the left hand edge 73$b$ of wall 71$b$. Section 28$b$ also includes in the top ledge of its relatively thin left hand wall 75$b$ a second tapered half rectangularly shaped portion 74$b$ which starts at gap 38$b$ and ends at the right hand edge 77$b$ of wall 75$b$. Since each of walls 71$b$ and 75$b$ are relatively thin, each of portions 72$b$ and 74$b$ extend only a very short distance into section 28$b$ from their associated one of gaps 36$b$ and 38$b$. When splicer 10 is assembled and spring clamp 28 is closed, portions 72$b$ and 74$b$ in combination with the first and second tapered half rectangularly shaped portions 72$a$ and 74$a$ of section 28$a$ of body half 14$a$ define first and second rectangularly shaped fiber channels 72 and 74 for the entry into spring clamp 28 of the cladding 20$a$, 21$a$ of the two fibers to be spliced.

Section 28$b$ also includes outside wall 76$b$ and inside wall 78$b$ parallel thereto. In combination walls 71$b$, 75$b$, 76$b$ and 78$b$ define a cavity 80$b$ which has a bottom 81$b$. As will be described in more detail hereinafter splicer 10 includes a coined metal splice element 82, shown in FIG. 3, which is assembled from mirror image element halves 82$a$ and 82$b$. When splicer 10 is fully assembled element half 82$b$ resides in cavity 80$b$ and element half 82$a$ resides in the cavity 80$a$ of body half 14$a$.

With splicer 10 fully assembled the opening of spring clamps 26 and 28 by the use of tool 12 allows a fiber 20 to be received in aperture 18. The cladding 20$a$ of the fiber is received in the right half of splice element 82. The opening of spring clamps 28 and 30 of the fully assembled splicer by the use of tool 12 allows a fiber 21 to be received in aperture 19. The cladding 21$a$ of that fiber is received in the left hand half of splice element 82. Also as will be described in more detail herein after it is splice element 82 which holds the cladding of each of the fibers in place when spring clamp 28 is closed.

Returning once again to FIG. 2 it is seen that section 28$b$ includes first and second ribs 84$b$ and 86$b$ in the bottom 81$b$ of cavity 80$b$. The ribs 84$b$ and 86$b$ are parallel to walls 76$b$ and 78$b$ and are in contact with the bottom of splice element half 82$b$ when splicer 10 is assembled. During that assembly procedure, which will be described in detail hereinafter, splicer 10 is subject to ultrasonic or other heating means which among other things partially melts the ribs to bring them into intimate contact with the bottom of the splice element half. This ensures that when tool 12 is inserted into the splicer 10 from either end and rotated in the direction that will spread the associated splice clamps, that a predetermined rotation of the tool will cause a predetermined deflection of the spring clamps.

Body half 14$b$ also includes a first half rectangularly shaped channel 88$b$ which extends to the left from aperture 22$b$ through section 26$b$ and the thin wall 71$b$ of section 28$b$. When splicer 10 is assembled, channel 88$b$ in combination with the first half rectangularly shaped channel 88$a$ of body half 14$a$ forms a rectangularly shaped channel 88 for receiving tool 12 when it is desired to open spring clamps 26 and 28. Body half 14$b$ also includes a second half rectangularly shaped channel 90$b$ which extends to the right from aperture 23$b$ through section 30 and the thin wall 75$b$ of section 28$b$. When splicer 10 is assembled, channel 90$b$ in combination with the second half rectangularly shaped channel 90a of body half 14a forms a rectangularly shaped channel 90 for receiving tool 12 when it is desired to open spring clamps 28 and 30.

Finally it is seen that body half 14b also includes in portion 91b parallel ribs 92b and 94b which extend longitudinally over almost the entire length of the body half. When splicer 10 is subject to ultrasonic or other heating means during its assembly these ribs also partially melt to ensure an intimate contact between the portions 91a and 91b of body halves 14a and 14b. Therefore when the assembly of splicer 10 is finished, the portions 91a and 91b define a unitized structure 91.

Referring once again to FIG. 3 there are shown the two identical halves 82a and 82b of splice element 82 just prior to the assembly of the splice element. Element half 82b includes upwardly projecting alignment boss or pin 96b and complementary alignment hole or opening 98b. When splice element halves 82a and 82b are mated together the alignment boss or pin 96b on element half 82b interferes with complementary alignment hole or opening 98a on element half 82a. Opening 98b on element half 82b interferes with the pin 96a on element half 82a.

When assembled splice element 82 has in end 100 an essentially equilateral diamond shaped aperture 102 to receive the cladding of fiber 20 and an essentially rectangularly shaped aperture 103 to receive tool 12. Also when assembled the splice element has in end 104 an essentially equilateral diamond shaped aperture 105 to receive the cladding of the fiber inserted into splice 10 from end 24 and an essentially rectangularly shaped aperture 106 to receive tool 12. Only half of these apertures are shown in FIG. 3.

Starting at aperture 102b, element half 82b has a first tapered half diamond shaped portion 107b. When splicer 10 is assembled the tapered half diamond shaped portion 107b in combination with the tapered half diamond shaped portion 107a of element half 82a defines a fiber "V" slot for the entry into the splice element of the cladding of fiber 20 when the tool 12 is inserted into splicer 10 from end 16 and rotated to open spring clamp 28. Starting at aperture 105b, element half 82b has a second tapered half diamond shaped portion 108b. When splicer 10 is assembled the tapered half diamond shaped portion 108b in combination with the tapered half diamond shaped portion 108a of element half 82a defines a fiber "V" slot for the entry into the splice element of the cladding of fiber 21 inserted when the tool 12 is inserted into splicer 10 from end 24 and rotated to open spring clamp 28.

Element half 82 also has a half equilateral diamond shaped portion 109b which extends between the first and second tapered half diamond shaped portions 107b and 108b. When splicer 10 is assembled the half equilateral diamond shaped portion 109b in combination with the half diamond shaped portion 109a of splice element 82a defines an equilateral diamond shaped groove 109 for receiving the claddings of the two fibers to be spliced when the associated set of spring clamps are opened by tool 12 and holding those claddings in place when the tool is removed from the splice.

Referring now to FIG. 4a, there is shown a section through assembled metal splice element 82. This section shows the interference between boss or pin 96b and hole or opening 96a and also between pin 98a and opening 98b when splice element 82 is assembled. While the assembly of splicer 10 will be described in connection with FIG. 5a, it should be evident from FIGS. 3 and 4a that assembly of splice element 82 is accomplished by placing the two halves 82a and 82b in alignment with one another and then lightly pressing them together so that the bosses 96b, 98a are forced into the associated one of openings 96a and 98b.

Referring now to FIG. 4b, there is shown a view of end 100 of metal splice element 82. As previously described, when splice element 82 is assembled, end 100 has in it an essentially equilateral diamond shaped aperture 102 to receive the cladding 20a of fiber 20 and an essentially rectangularly shaped aperture to receive tool 12. As described above, aperture 102 leads to an essentially equilateral diamond shaped groove 109 for holding the cladding in place when a fiber has been inserted in splicer 10 and tool 12 has been removed from the splice.

Referring now to FIGS. 4c, 4d and 4e there is shown enlargements of a section through the metal splice element showing groove 109. Groove 109 is formed from two opposing ninety degree (90°) "V" grooves 109a and 109b to give rise to four common longitudinal planes when element 82 is assembled. It is these two "V" grooves which fixedly hold the cladding of a fiber inserted into splicer 10 after the tool 12 has been removed from the splice.

FIG. 4c shows the groove 109 when neither a fiber 20 or a tool 12 has been inserted in splicer 10. This will be referred to hereinafter as the quiescent mode of operation of splicer 10. The width of the groove 109 is designated as "a" in FIG. 4c. It should be understood that as FIG. 4c is an enlargement of a section through groove 109, that the spacing shown between the edges of splice element halves 82a and 82b in FIG. 4c in the quiescent mode is extremely small and essentially nonexistent.

FIG. 4d shows the splice element 82 and the groove 109 after tool 12 has been inserted in end aperture 22 of end 16 of splicer 10 and has been rotated in a direction so as to maximally deflect spring clamps 26 and 28 so that fiber 20 can be either inserted into aperture 18 or removed therefrom. Due to the intimate contact between sections 28a and 28b and splice elements 82a and 82b, respectively, the opening of groove 109 of the splice element 82 is at a maximum when spring clamp 28 maximally deflects. This mode of operation of splicer 10, i.e. insertion of tool 12 into either end of the splice and rotating it in the direction which maximally deflects the associated spring clamps will be referred to hereinafter as the transition mode of operation of splicer 10. The tool 12 is designed to spread the edges of each of the two halves of splice element 82 by an equal distance designated as "b/2" about the centerline 82c shown in FIG. 4d. Therefore the total spread of splice element 82 when tool 12 is inserted in aperture 22 and rotated to maximally deflect the spring clamps is designated as "b".

FIG. 4d also shows a section through a fiber 20 which has been inserted into groove 109 of splicer 10 during the transition mode of operation. The diameter of the cladding 20a of the fiber is designated as "d". It is seen from FIG. 4d that the tool 12 is designed to spread groove 109 by a distance sufficient to allow a fiber 20 to be easily inserted into groove 109 or removed therefrom during the transition mode. It is also seen from FIG. 4d that the total spread b of splice element 82 is not so large so as to allow the fiber to move out of groove 109 and into the nongroove spacing between the edges of the two splice element halves. In other words, distance b is less than fiber diameter d.

FIG. 4e shows the splice 82 and groove 109 after a fiber has been inserted in aperture 18 and the cladding 20a has entered groove 109 and the tool has rotated in the opposite direction to thereby remove the force it is providing to deflect the spring clamps. This will be referred to hereinafter as the operating mode of splicer 10. In the operating mode the space between the edges of splice element halves 82a and 82b is designated as "c". As fiber 20 is centered in groove 109 each of elements 82a, 82b is deflected by the same distance "c/2" about centerline 82c. The width "a" of groove 109 is selected to provide the desired spacing "c" in the operating mode.

Typical values for width "a", transition mode maximum deflection "b", operating mode spacing "c" and fiber cladding diameter "d" will be given when the use of splicer 10 is described in connection with FIG. 5b.

As can been seen from FIG. 4e in the operating mode the two opposed 90° "V" grooves 82a, 82b provide four common longitudinal planes which cooperate to fixedly retain the cladding 20a of fiber 20. As is well known, the use of four common longitudinal planes which are displaced 90° from one another provides in the operating mode an equal displacement on the cladding in all radial directions. In addition, the clamping force has the same angular relationship with each of the planes.

In summary, splicer 10 has with respect to each of its ends three modes of operation. They are:

i) the quiescent mode wherein neither a fiber nor the tool has been inserted into one end of the splicer;

ii) the transition mode wherein the tool has been inserted into the associated aperture of one end and rotated so as to maximally deflect the spring clamps and maximize the opening of groove 109; and iii) the operating mode wherein a fiber resides in the splicer and its cladding is in groove 109 and tool 12 has either been removed from the associated aperture or has been rotated back to the position which removes its deflecting force from the spring clamps.

It should be appreciated that each end of splicer may be in any one of the three possible modes described above and the mode for one end is independent of the mode for the other end. For example, one end of splicer 10 may be in the operating mode while the other end can be in any one of the three possible modes.

As described above splice element 82 is metallic. In selecting the metal out of which the halves of element 82 is to be fabricated the minimum tensile strength of the optical fiber which is about 2½ pounds and the static coefficient of friction which is 0.5 must be taken into account. Dividing the former by the latter gives about five (5) pounds which is the required normal clamping force. In other words, when splicer 10 is in its operating mode, the spring clamps must hold the cladding and buffer with a normal force of about five pounds so that if anyone pulls on either of the fibers with more than that force, that fiber will break rather than degrade. This provides a visual indication that the fibers are no longer spliced.

Additionally, it is important that the metallic material out of which element 82 is fabricated not be subject to plastic deformation when the fiber is pulled by the above force. If the material is such as to undergo plastic deformation then the shape of V groove 109 would change and it would be necessary to also replace splicer 10 as well as prepare the fiber for reinsertion into the splicer. Elastic deformation is, on the other hand, desirable for alignment of different fiber diameters. We have found after evaluating various aluminum alloys for use in fabricating the splice element that the higher strength alloys are better for that purpose (elastic deformation without plastic deformation) than the lower strength alloys.

It is also quite important that groove 109 be highly resistant to gouging and chipping upon repeated insertions of a fiber therein. This ensures that splicer 10 will be usable for multiple reentries if necessary. We have also found that anodizing provides such high resistance to chipping and gouging and that higher strength aluminum alloys are more suitable to such anodizing. We have further found that in anodizing the alloy it is desirable that the alumina be the thinnest uniform layer possible that provides the desired resistance to chipping and gouging.

In one embodiment for splice element 82 the aluminum alloy used was American Society of Metals type 5202-H32 which is available from many different sources. The anodizing was accomplished using an electrolyte of boric acid and sodium potassium tartrate and a voltage of 200 volts. This provided a hard uniform layer having a thickness of one-quarter (¼) micron. This appears to be the thinnest uniform layer which resists chipping and gouging.

Referring now to FIG. 5a there is shown an exploded perspective of splicer 10 prior to assembly. That assembly will now be described.

The assembly of splicer 10 first starts with the assembly of splice element 82. As described above, that element is assembled by placing the two halves in alignment with each other and then lightly pressing them together so that the boss of each one of the halves interferes with the associated opening on each one of the halves. After splice element 82 has been assembled it is seated in the recess 80a or 80b of one of the splice body halves 14a or 14b so that the bottom of splice element half 82a or 82b is in contact with bottom 81a or 81b of the recess 80a or 80b. The other body half 14b or 14a of body 14 is then placed on top of body half 14a or 14b so that opening 46a aligns with boss 44b and boss 44a aligns with opening 46b. The two body halves are then pressed together.

In order that sections 26, 28 and 30 of body 14 properly function as spring clamps it is necessary to provide a firm joint between the associated sections of each body half which together form those clamps. That joint is provided by subjecting the assembled splice to ultrasonic or other heating means to thereby partially melt the ribs 92b and 94b (see FIG. 2) of body portion 91b and the ribs 92a and 94a of body portion 91a to provide a unitized structure 91. In other words, body portions 91a and 91b are fused together.

Such ultrasonic or other heating means also partially melts the ribs 84b and 86b of recess 80b (see FIG. 2) to bring them into intimate contact with the bottom of splice element half 82b. The ribs 84a and 86a of recess 80a are also partially melted to bring them into intimate contact with the bottom of splice element body half 82a. As previously described above, this intimate contact between the ribs in the bottom of recesses 80a and 80b and the bottom of the associated splice element body 82a and 82b ensures that a predetermined rotation of tool 12 will cause a predetermined deflection of the spring clamps.

The assembly of the splicer 10 is summarized as follows:

i) aligning splice element body halves 82a and 82b and then pressing them in place;

ii) placing the assembled splice element in the recess 80a or 80b of either of body halves 14a or 14b;

iii) taking the other body half 14a or 14b, i.e. the one in which assembled splice element has not been placed, and after aligning it with the body half in which the splice element has been placed, pressing it onto that body half; and iv) subjecting the assembly of splice element 82 and body 14 to ultrasonic or other heating means so as to partially melt the abutting ribs in each body half to thereby fuse those body halves to each other so as to provide a unitized construction to the spring clamps and also to partially melt the ribs in contact with each splice element half so as to establish an intimate contact between each body half and the bottom of the associated splice element half.

Referring now to FIG. 5b there is shown splicer of FIG. wherein the majority of spring clamp section 28a has been cut away in order that the use of splicer 10 can be described. In FIG. 5b the tool 12 has been inserted in aperture 22 and has been rotated in the direction which maximally deflects spring clamps 26 and 28. Fiber 20 has been inserted in aperture 18. Prior to this, a craftsperson has prepared fiber 20 by, among other things, cleaving the end of the fiber and removing a length of buffer 20b sufficient so that when fiber 20 is fully inserted in aperture 18 the cladding 20a projects slightly more than halfway into splice element 82.

The length of buffer 20b that the craftsperson removes from fiber 20 depends on the dimensions of splicer 10 and the buffer diameter. As was described in connection with FIG. 2, section 26 of splicer 10 includes channels 50 and 54 to hold in place a 900 um and a 250 um buffer, respectively. Channel 50 is closer to end 16 than channel 54. Therefore, the craftsperson must remove more of the fiber buffer when the buffer diameter is 900 um than must be removed when that diameter is 250 um. In one embodiment for splicer 10, between seven and eight mm of the buffer 20b must be removed from fiber 20 as measured from the cleaved end of the fiber when the buffer diameter is 250 um, while between 16½ and 17½ mm of the buffer must be removed when the buffer diameter is 900 um.

The use of splicer 10 will now be described with respect to end 16 and fiber 20, it being understood, however, that this description also applies to fiber 21 inserted into or removed from end 24. If the fiber 20 is to be inserted into splicer 10 a craftsperson will first prepare the fiber in the manner described above. The craftsperson would then, using one hand, insert tool 12 into aperture 22. The orientation of the tool with respect to aperture 22 just prior to insertion is shown in FIG. 1. The craftsperson would then rotate the tool in the direction which maximally deflects spring clamps 26 and 28.

The deflection, i.e. opening of groove 109 of splice element 82 is also a maximum due to the intimate contact between sections 28a and 28b and splice element halves 82a and 82b, respectively. The splicer 10 is now ready to accept fiber 20. Since the nominal cladding diameter ("d" of FIGS. 4d and 4e) of a fiber is 125 um (about 0.0050 inches), the maximum deflection of groove 109 ("b" of FIG. 4d) must not be more than 0.0040 inches (about 101 um) otherwise the fiber will tend to wander out of the groove 109 during insertion. In one embodiment for splicer 10 the maximum deflection of groove 109 was 0.0035 inches (about 89 um) and therefore each of the two halves of the splice element 82 deflected 0.00175 inches about centerline 82c.

Tool 12 after rotation remains in position without any need for the craftsperson to hold it. Therefore, the craftsperson may use the same hand that rotated the tool or the other hand to insert fiber 20 into aperture 18, tilting it slightly away from the splicer's longitudinal axis to facilitate entry and push it slowly and evenly into splicer 10 until resistance is met. This indicates that the buffer is fully seated in, i.e. completely fills, the associated one of the two channels 50 and 54 in section 26 and that the cladding projects slightly more than halfway through the splice element 82.

The craftsperson would then rotate the tool in the direction opposite to the one which maximally deflected the spring clamps. This opposite rotation of the tool removes its deflecting force from the spring clamps 26 and 28. Splicer 10 would then be in its operating mode with regard to fiber 20. It is to be noted that the craftsperson may not have to release fiber 20 in order to operate tool 12. Therefore the seating of the fiber buffer in the associated one of the buffer channels 50 or 54 and the cladding in groove 109 is not disturbed in order to lock the fiber in place. The steps described above for inserting fiber 20 into the splicer are also used to remove a fiber 20 that has previously been inserted in the splicer.

It should be noted that the length of tool 12 is such as to not disturb any fiber 21 that has been inserted into splicer 10 from end 24. As can be seen from FIG. 5b, tool 12 deflects spring clamps 26 and 28 but does not deflect spring clamp 30. While the deflection of clamp 28 may remove the forces on the cladding of fiber 21 inserted from end 24, fiber 21 is still fixedly held in place by spring clamp 30 which is not deflected by the tool. Also as is shown in FIG. 4d, the opening of splice element 82 does not allow the cladding 21a of a fiber 21 inserted from end 24 to leave the groove 109.

With fiber 20 inserted in the splicer 10, the insertion of fiber 21 differs from that of fiber 20 in that the buffer 21b of that fiber may not completely fill the associated one of channels 62 and 66. As the cladding 20a of fiber 20 projects slightly more than halfway through element 82, the tip of the cladding of fiber 21 meets the tip of the cladding of fiber 20 before the buffer 21b may completely fill the associated channel. It is this meeting of the cladding tips, i.e. cleaved ends of the two fibers, which provides feedback to let the craftsperson know that the fiber tips are in contact with each other.

As previously described, body halves 14a, 14b are fabricated from a polymer. The cantilever spring clamps 26, 28 and 30 must exert sufficient normal force so as to retain the fiber against axial forces. As described above, for splice element 82 that force is in the order of five pounds. If the spring clamps were to exert substantially more force than five pounds the fiber might crack or microbends, which cause light to be lost from the fiber, might occur.

When a fiber having a nominal cladding diameter ("d" of FIG. 4d) of 125 um (about 0.0050 inches) is in groove 109, and splicer 10 is in its operating mode, the spacing ("c" of FIG. 4e) between the edges of ice element halves 82a and 82b is in the order of 0.0020 inches (about 50 um). Each edge is then 0.0010 inches (about 25 um). above the centerline 82c of the splice element.

As the splice element halves are in intimate contact with the associated one of the body halves 14a, 14b then the associated ones of the clamp spring sections 26a, 26b; 28a, 28b; and 30a, 30b are each also deflected about 0.001 inches when splicer 10 is in its operating mode. In order to provide the spacing of 0.0020 inches in the operating mode, the width of groove 109 ("a" of FIG. 4c) was selected to be about 0.0048 inches (about 122 um).

We have found that fabricating body halves 14a, 14b from a glass filled, high performance polymer will satisfy the above criteria. In one embodiment for the body halves 14a, 14b, those halves were fabricated using such a polymer which is commercially available from General Electric and is sold under the trademark VALOX.

In assembling one embodiment of splicer 10 as described above in connection with FIG. 5a wherein the body halves 14a, 14b were fabricated from the VALOX polymer and the splice element halves were fabricated from the 5202-H32 aluminum alloy, a 2,000 watt machine was used for 0.3 seconds to ultrasonically weld the splicer.

Body halves 14a, 14b and splice element halves 82a, 82b may be fabricated either by using a stamping or molding die. Some adjustment of the die may first be necessary in order to ensure that the boss and openings on the mirror image halves and in particular the V grooves are in alignment with each other. Once that adjustment has been made, no further adjustment should be necessary in the die during its useful life.

As is well known, after splicer 10 has been completely assembled an indexing gel may be injected into the fiber apertures of the splicer.

Referring now to FIGS. 6a and 6b there is shown an embodiment for the polymer spring splicer of the present invention which can clamp three different buffer diameters. FIG. 6a shows that splicer 110 fully assembled while FIG. 6b shows one of the two splice body halves 114a, 114b. A comparison of FIGS. 6a and 6b with FIGS. 1 and 2, respectively shows that the present embodiment is in many respects identical to the splicer embodiment shown in FIGS. 1 and 2. Therefore it is only necessary to describe in detail the differences between this embodiment and the embodiment shown in FIGS. 1 and 2.

The splicer 110 of FIG. 6a has a rectangularly shaped polymer body 114 which is assembled from mirror image rectangularly shaped polymer body halves 114a and 114b in the same manner as was previously described in connection with FIG. 5. At first end 116 of body 114 there is a first essentially rectangularly shaped aperture 118 for receiving a buffered optical fiber 20 to be spliced. End 116 also includes a second essentially rectangularly shaped aperture 122 for receiving tool 12. Body 114 also includes a second end 124 which also has a first essentially rectangularly shaped aperture 119 identical to aperture 118 for receiving buffered optical fiber 21 to be spliced to fiber 20. Second end 124 also has a second essentially rectangularly shaped aperture 123 identical to aperture 122 for receiving tool 112.

As is shown in FIGS. 6a and 6b each half 114a, 114b of body 114 is divided into the five sections 126a, 128a, 130a, 132a and 134a of body half 114a and the five sections 126b, 128b, 130b, 132b and 134b of body half 114b. Sections 126a and b are identical in length to sections 134a and b. Sections 128a and b are identical in length to sections 132a and b. Each of the sections are separated from the next adjacent section by the associated one of elongated U shaped gaps 136a and b, 138a and b, 140a and b, and 142a and b. Gaps 136a and b separate sections 126a and b, and 128a and b; gaps 138a and b separate sections 128a and b and 130a and b; gaps 140a and b separate sections 130a and b and 132a and b; and gaps 142a and b separate sections 132a and b and 134a and b.

In assembled splicer 110 sections 126a, 126b; 128a, 128b and 130a, 130b of body halves 114a and 114b function as double cantilever spring clamps 126, 128 and 130, respectively, to retain buffered fiber 20 after it is received in aperture 118. More specifically, spring clamp 130 retains the cladding 20a of fiber 20 while either of spring clamps 126, 128 retain the buffer 20b of that fiber depending on the diameter of that buffer. In an identical fashion sections 130a, 130b; 132a, 132b and 134a, 134b of body halves 114a and 114b function in the assembled splice as double cantilever spring clamps 130, 132 and 134, respectively, to retain the buffered fiber 21 received in the essentially rectangularly shaped aperture of end 124. More specifically spring clamp 130 retains the cladding 21a of fiber 21 while either of spring clamps 132, 134 retain the buffer 21b of fiber 21 depending on the diameter of that buffer.

Tool 112 is used to open spring clamps 126, 128, and 130 in the same manner as was described for spring clamps 26 and 28 of splicer 10 so that fiber 20 can be received in or removed from aperture 118 in end 116. As in splicer 10 the length of tool 112 is such that the tool only projects inwardly into housing 114 a distance sufficient to open only spring clamps 126, 128 and 130 and not to affect any fiber that may have been received in the essentially rectangularly shaped aperture in end 124 and is held in place in splicer 110 by clamps 130, 132 and 134.

In a similar manner tool 12 is used to open spring clamps 130, 132 and 134 so that fiber 21 can be received in or removed from aperture 119 in end 124. As described above the length of tool is such as to only open spring clamps 130, 132 and 134 and not to affect any fiber that may have been received in aperture 118 and is held in place in splicer 110 by clamps 126, 128 and 130. As with splicer 10 a craftsperson can spread those of the spring clamps of splicer 110 associated with one of the fibers using only one hand and with that hand or the other hand either insert into or remove from those spring clamps that fiber without disturbing a fiber that has been received in the spring clamps associated with that other fiber.

As was described above the body halves 114a, 114b are mirror images of each other and when mated together form apertures 118, 119, 122 and 123. Therefore only the half of those apertures 118b, 119b in end 116b and the half of those apertures 122b, 123b in end 124b of body half 114b are shown in FIG. 6b. Body half 114b includes upwardly projecting alignment boss or pin 144b and complementary alignment hole or opening 146b. When polymer body halves 114a and 114b are mated together during the assembly of splicer 110 the alignment boss or pin 144b on body half 114b interferes with the complementary alignment hole or opening 146a on body half 114a. Opening 146b on body half 114b interferes with the pin 144a on body half 114a.

Starting at aperture 118b, section 126b has a first tapered half rectangularly shaped portion 148b which is followed by a first half rectangularly shaped portion 150b. When splicer 110 is assembled from body halves 114a and 114b and spring clamp 126 is closed, half rectangularly shaped portion 150b in combination with half rectangularly shaped portion 150a of body half 114a defines an elongated rectangle 150 whose height is sufficient to hold in place a 900 um buffer 120b. Following half rectangularly shaped portion 150b, section 126b has a second tapered half rectangularly shaped portion 152b. A second half rectangularly shaped portion 154b starts at the left hand end of portion 152b and ends at gap 136b. When splicer 110 is assembled and spring clamp 126 is closed, half rectangularly shaped portion 154b in combination with half rectangularly shaped portion 154a of body half 114a defines an elongated rectangle 154 whose height is sufficient to hold in place a 500 um buffer 20b.

Starting at gap 136b, section 128b has a tapered half rectangularly shaped portion 156b which is followed by a half rectangularly shaped portion 158b which ends at gap 138b. When splicer 110 is assembled and spring clamp 128 is closed, half rectangularly shaped portion 158b in combination with half rectangularly shaped portion 158a of body half 114a defines an elongated rectangle 158 whose height is sufficient to hold in place a 250 um buffer 20b.

In a similar manner, section 134b has first and second tapered half rectangularly shaped portions 160b and 164b and first and second half rectangularly shaped portions 162b and 166b. When splicer 110 is assembled and spring clamp 134 is closed, half rectangularly shaped portions 162b and 166b in combination with half rectangularly shaped portions 162a and 166a of body half 114a define elongated rectangles 162 and 166, respectively whose heights are sufficient to hold in place a 900 um and a 500 um buffer, respectively. Also in a similar manner, section 132b has a tapered half rectangularly shaped portion 168b and a half rectangularly shaped portion 170b. When splicer 110 is assembled and spring clamp 132 is closed, half rectangularly shaped portion 170b in combination with half rectangularly shaped portion 170a of body half 114a defines an elongated rectangle 170 whose height is sufficient to hold in place a 250 um buffer.

Section 130b shown in FIG. 6b need not be described in detail as it is identical in structure and function to section 28b of body half 14b of splicer 10. In addition the rest of body half 114b need be described as it is identical in structure and function to those parts of body half 14b which are designated by reference numerals which only differ from those shown in FIG. 6b by the absence of a hundreds position. With splicer 110 fully assembled the opening of spring clamps 126, 128 and 130 by the use of tool 112 allows a fiber 20 to be received in aperture 118. The cladding of the fiber is received in the right hand half of splice element 182. The opening of spring clamps 130, 132 and 134 of the fully assembled splice by the use of tool 112 allows a fiber 21' to be received in aperture 119. The cladding 21a of that fiber is received in the left hand half of splice element 182.

Referring now to FIG. 7 there is shown an embodiment for the polymer spring splicer of the present invention which can clamp any number of different buffer diameters using only a single splice clamp 226. FIG. 7 shows that splicer 210 fully assembled. There isn't any need to show either of the two splice body halves 214a, 214b as they will be identical to the body half shown in FIG. 2 for clamping two different buffer sizes or to the body half shown in FIG. 6b for clamping three different buffer sizes with the sole exception that the body halves 214a, 214b will not have the gaps shown in FIGS. 2 and 6b.

Tool 212 is shown in FIG. 7 as identical to tool 12 of FIG. 1, i.e. for a splicer 210 which clamps two different buffer sizes. If splicer 210 were designed to clamp three different buffer sizes, then tool 212 would be identical to tool 112 of FIG. 6a.

We have found that when tool 212 is inserted in aperture 222 and rotated in a direction so as to deflect the body halves a fiber 20 may be inserted into or removed from aperture 218 without disturbing any fiber which has been inserted in aperture 219. In other words the single splice clamp 226 is sufficient to hold in position a fiber inserted in one of the apertures 218 or 219 when the tool is used to deflect clamp 226 so that a fiber can inserted into or removed from the other of the apertures 219 or 218. A comparison of FIG. 7 with FIGS. 1 and 6a shows that the present embodiment is except for the absence of any gaps otherwise identical to the splice embodiments shown in those figures. Therefore it is not necessary to describe splicer 210 any further.

Referring now to FIG. 8a there is shown tool 12 of FIG. 1. Tool 12 has a handle 12a and a shaft 12b extending outwardly therefrom. The shaft 12b is divided into first and second portions 12c and 12d, respectively. Portion 12c starts at handle 12a and is about twice as long as portion 12d. As can be seen from FIG. 8a portion 12c is wider than portion 12d. The differing widths of the shaft portions gives rise to shoulders 12e on the shaft at that location wherein portion 12c ends and portion 12d begins.

Referring back to FIGS. 1, 2, 3 and 5a, it can be seen that when tool 12 is fully inserted into aperture 22 of end 16, that shaft portion 12c resides in that part of channel 88 which is in section 26. Shaft portion 12d resides in that portion of channel 88 which is in the thin wall 71 of section 28 and the channel 101 of splice element 82 which is also in section 28.

While not that clearly shown in FIGS. 2 and 3, the portion of channel 88 in section 26 is wider than the portion of channel 88 and channel 101 in section 28. When a craftsperson inserts tool 12 into aperture 22, shoulders 12e come into contact with the outside parts of end wall 71 adjacent channel 88. This contact provides feedback to let the craftsperson know that the tool is fully inserted in aperture 22. As is clearly shown in FIG. 5a, when tool 12 is fully inserted, shaft portion 12d extends about halfway through channel 101. When tool 12 is fully inserted in aperture 22, only spring clamps 26 and 28 and not spring clamp 30 are deflected by rotation of the tool.

Referring to FIGS. 8b and 8c there are shown sections through shaft portions 12d and 12c, respectively. As can be seen, each of the shaft portions has an essentially rectangular cross-section. The edges 12f of portion 12c and 12g of portion 12d are rounded, making it easier to rotate the tool both in the direction that fully deflects the spring clamps and in the opposite direction.

While tool 12 has been shown to have a handle 12a which is substantially coaxial with the axis of shaft 12b, it should be appreciated that the handle may also be offset with respect to the shaft axis.

The tool 112 for use with splicer 110 of FIG. 6a is identical to the tool 12 of FIG. 8a except that its shaft 112b is divided into three essentially equal portions each associated with a respective one of spring clamps 126, 128, 130 or 130, 132, 134. The portion 112c closest to the handle 112a is wider than portion 112d which in turn is wider than portion 112e. The width of portion 112e of tool 112 is the same as the width of portion 12d of tool 12 as both reside in channel 101 of splice element 82 when the tool is fully inserted into either end of the associated one of splicers 10 and 110.

Tool 112 has first and second shoulders 112f and 112g. Channels 188 and 190 of splicer 110 (see FIG. 6b) have their widest width in sections 126 and 134, respectively; an intermediate width in sections 128 and 132, respectively; and their narrowest width in the end walls 171b and 175b, respectively. When tool 112 is fully inserted in splicer 110, shoulders 112f make contact with that end of channels 188 or 190 in sections 128 or 132 closest to gap 136 or 140 and shoulders 112g make contact with the outside of end wall 171 or 175 to indicate that the tool is fully inserted in the splicer.

As with tool 12, the edges 112h, 112j, and 112k of portions 112b, 112c and 112d, respectively, are rounded.

The splicer of the present invention may be mounted in panels in very high densities. One such example is shown in FIG. 9 wherein a panel 300 includes seven (7) rows each capable of having eight (8) of splicers 10 inserted therein. Panel 300 then has 56 rectangular openings 302 each capable of having a splicer 10 inserted therein. Solely for simplicity of illustration, splicers 10 are shown in FIG. 9 as inserted only in the top row and right hand column of panel 300. Panel 300 includes openings 304 which are used to mount the panel to a suitably arranged frame (not shown).

In order that splicer 10 be inserted in opening 302 there is associated with each splicer a rectangularly shaped ferrule 306. Prior to inserting each splicer 10 into an opening 302 the ferrule 306 is slipped over the splicer and centered thereon. The combination of splicer 10 and ferrule 306 is then inserted in opening 302. Each ferrule has two outwardly projecting spring tabs 308 and a raised edge 306d which are used to cooperatively engage the opening 302 to thereby securely maintain the splicer-ferrule combination in the opening. One such spring tab 308 is shown in FIG. 9 wherein a portion of the upper left edge of panel 300 has been cut away adjacent to the left most opening in the first row.

Referring now to FIGS. 10a, 10b, and 10c, there are shown various views of ferrule 306. Spring tabs 308 are most clearly shown in FIGS. 10a and 10b. The spring tabs 308 are located in openings 306a in the wide sides 306b of rectangularly shaped ferrule 306. There is one opening and one spring tab per wide side. Each spring tab includes an arm 308a with an outwardly projecting raised right triangularly shaped portion 308b thereon. When the combination of ferrule 306 and splicer 10 is fully inserted in an opening 302, portion 308b positively engages the rear 300a (see FIG. 9) of panel 300 to thereby aid in holding splicer 10 firmly in opening 302. An appropriate tool such as a thin flat bladed screwdriver may then be used to depress tabs 308 so that the splicer-ferrule combination can be removed from opening 300 for any reason.

Referring specifically to FIGS. 10a and 10b it is seen that ferrule 306 includes at end 306c the raised edge 306d. As can be seen from FIG. 9 when the combination of splicer and ferrule is fully inserted in an opening 302, edge 306d abuts the front 300b of panel 300. Therefore, when ferrule 306 is fully inserted in panel 300, tabs 308 and raised edge 306d cooperate to firmly hold the combination of ferrule and splicer in panel 300.

Referring now to FIG. 10c it is seen that ferrule 306 includes in each of its wide sides 306b a hemicylindrically shaped rib 306e which projects into rectangular aperture 306h. The ribs are located on the wide sides near to narrow side 306f which has a gap 306g therein. Turning back momentarily to FIGS. 1 and 5a, it is seen that body half 14a of splicer 10 includes in section 28a an elongated hemicylindrically shaped recess 29a. While not shown in either of the above figures, body half 14b also includes in section 28b a mirror image elongated hemicylindrically shaped recess 29b.

Recesses 29a, 29b are complementary in shape to projecting ribs 306e and each have a length which is at least as long as the ribs. The ferrule 306 is slipped over splicer 10 such that gap 306g in narrow side 306f is adjacent the unitized structure 91. The primary function of gap 306g is to allow the ferrule to spread open, i.e. enlarge aperture 306h, when it is slipped over the splicer. When the ferrule is centered on the splicer, the ribs 306e positively engage the associated one of recesses 29a, 29b. This positive engagement lets the craftsperson know that the ferrule is centered on the splicer and that the splicer-ferrule combination is now ready for insertion in one of openings 302.

There is sufficient flexibility in ferrule 306 that it usually can easily be removed from a splicer on which it was previously installed. It should be noted, however, that gap 306g allows a craftsperson to use an appropriate tool such as a thin bladed screwdriver if it is ever necessary to disengage the ribs 306e from the recesses 29a, 29b in order to remove the ferrule from the splicer. It should also be noted that ferrule 306 does not interfere with the operation of splicer 10 when it is installed on the splicer. It should also be further noted that while ferrule 306 has been shown in combination only with splicer 10, it may also be used with splicers 110 and 210 of FIGS. 6a and 7, respectively. To that end both of those splicers also include elongated hemicylindrically shaped recesses 129a, 129b and 229a, 229b, respectively. In one embodiment, ferrule 306 was fabricated using the same VALOX polymer that was used to fabricate body halves 14a, 14b of splicer 10.

It is to be understood that the description of the preferred embodiments are intended to be illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A splicer for at least two optical fibers comprising:
a) a housing having at least two openings each associated with one of said at least two optical fibers and at least one double cantilever spring means; and
b) fiber receiving and positioning means in said housing extending between said at least two openings, said at least one double cantilever spring means clamping both of said at least two fibers when each one of said fibers are introduced in said fiber receiving and positioning means from said associated one of said at least two openings to a point in said housing which is about halfway between said at least two openings, and wherein said clamping for each of said at least two fibers is independent of each other; wherein said housing comprises first and second body halves, said body halves being joined in such a way as to form said at least one double cantilever spring means; and further comprising splice element means centrally located in said housing, said fiber receiving and positioning means also passing through said splice element means such that said about halfway point is about in the middle of said fiber receiving and positioning means passing through said splice element means.

2. The splicer of claim 1 wherein said at least two fibers are first and second fibers, said at least two openings are first and second openings, said fiber receiving and positioning means extending between said first opening sand said second opening, said spring means clamping said first and second fibers when each one of said fibers are in said receiving and positioning means from said associated one of said openings to said about halfway point, said clamping for said first fiber independent of said clamping for said second fiber.

3. The splicer of claim 1 wherein said housing is fabricated from a glass filled high performance polymer.

4. The splicer of claim 1 wherein said first and second body halves are partially fused to each other to define a unitized structure for said at least one double cantilever spring means.

5. The splicer of claim 1 further comprising means for deflecting said at least one double cantilever spring means between one of said at least two openinqs and said about halfway point so that said associated one of said fibers can be moved in said fiber receiving and positioning means.

6. The splicer of claim 1 further comprising means for deflecting both a part of said at least one double cantilever spring means and said splice element means so that a fiber can be moved in said fiber receiving and positioning means only from one of said openings to said about halfway point.

7. The splicer of claim 6 wherein said deflecting means comprises tool receiving means in said housing extending between said at least two openings and passing through said splice element means, said part of said at least one double cantilever spring means and said splice element means being deflected when a tool is inserted into said tool receiving means and said tool is moved in a predetermined direction.

8. The splicer of claim 7 wherein said housing includes means for ensuring an intimate contact between said splice element means and said housing so that when said tool is inserted in said tool receiving means a predetermined movement of said tool will cause a predetermined deflection of said at least one double cantilever spring means and of said splice element means.

9. The splicer of claim 8 wherein said intimate contact means are fabricated from a material which partially melts when said splicer is subjected to ultrasonic or other heating means upon assembly.

10. The splicer of claim 9 wherein both said housing and said intimate contact means are fabricated from a high performance glass filled polymer.

11. The splicer of claim 10 wherein said intimate contact means are ribs centrally located in said housing.

12. The splicer of claim 1 wherein said splice element means is formed of a material that undergoes elastic deformation so as to permit said splice element means to retain a fiber inserted therein, said material not undergoing plastic deformation.

13. The splicer of claim 12 wherein said splice element means material is an aluminum alloy of high strength.

14. The splicer of claim 1 wherein said splice element means comprises two similar halves each having half of said passing fiber receiving and positioning means.

15. The splicer of claim 14 wherein each of said splice element means similar halves is fabricated from an aluminum alloy of high strength and each of said halves half passing through fiber receiving and positioning means is anodized with a relatively thin and uniform layer to thereby deter gouging and chipping upon repeated insertions of a fiber therein.

16. The splicer of claim 15 wherein the thickness of said anodized layer is about 0.25 micron.

17. The splicer of claim 1 wherein said fiber receiving and positioning means can accommodate a plurality of buffer sizes for each of said at least two optical fibers.

18. A splice element for use in splicing at least two optical fibers, said splice element being formed from two similar halves, each of said halves comprising:
(a) a fiber supporting surface having two longitudinal planes at an angle with respect to each other which is essentially ninety degrees; and
(b) half of a means for spreading said splice element so that a fiber may be moved in said splice element; and wherein each of said halves is formed of a material that undergoes elastic deformation to permit said fiber supporting surface to clamp either or both of said two optical fibers which are inserted therein, said material not undergoing plastic deformation, such that said splice element is reusable.

19. The splice element of claim 18 wherein said material is metal.

20. The splice element of claim 19 wherein said metal is a high strength aluminum alloy.

21. The splice element of claim 20 wherein each of said halves fiber supporting surface is anodized with a relatively uniform and thin layer to thereby deter gouging and chipping upon repeated insertions of either or both of said two optical fibers 22. The splice element of claim 21 wherein the thickness of said anodized layer is about 0.25 micron.

23. The splice element of claim 18 wherein each of said halves further comprises means for engaging each other.

24. The splice element of claim 23 wherein each of said engaging means comprises first and second engaging means, said first means of one of said splice element halves engaging said second means of the other of said splice element halves when said splice element is assembled and said first means of said other splice element half engaging said second means of said one splice element half when said splice element is assembled.

25. The splice element of claim 18 wherein said at least two fibers are two fibers and each of said body halves has two ends and each of said body halves also has a first tapered half diamond shaped channel between one of said ends and said fiber supporting surface for entry of one of said fibers into said fiber supporting surface and a second tapered half diamond shaped channel between the other of said ends and said fiber supporting surface for entry of the other of said fibers into said fiber supporting surface.

26. A method for assembling a fiber optic splicer, said splicer comprise splice element having first and second similar body halves and first and second outside body halves each of which has a recess for receiving said splice element, said method comprising the steps of:
a) assembling said first and second splice element body halves to form said splice element;

b) placing said splice element in said recess of one of said first and second outside body halves;

c) assembling said first and second outside body halves to form said splicer; and d) fusing predetermined portions of said first and second outside body halves to each other.

27. The method of claim 26 wherein each of said first and second splice element body halves has means or engaging each other and said method comprises prior to said step of assembling said first and second ice element body halves the step of aligning said first and second splice element body halves engaging means with each other.

28. The method of claim 27 wherein each of said first and second splice element body halves engaging means comprises first and second means, said first means of said first splice element body half engaging said second means of said second splice element body half when said splice element is assembled and said first means of said second splice element body half engaging said second means of said first splice element body half when said splice element is assembled, and said aligning step includes the step of aligning said first splice element body half first engaging means with said second splice element body half second engaging means and aligning said first splice element body half second engaging means with said second splice element body half first engaging means.

29. The method of claim 26 wherein each of said first and second outside body halves has means for engaging each other and said method comprises prior to said step of assembling said first and second outside body halves the step of aligning said first and second outside body halves engaging me with each other.

30. The method of claim 29 wherein each of said first and second outside body halves engaging means comprises first and second means, said first means of said first outside body half engaging said second means of said second outside body half when said first and second outside body halves are assembled and said first means of said second outside body half engaging said second means of said first outside body half when said first and second outside body halves are assembled, and said aligning step includes the step of aligning said first outside body half first engaging means with said second outside body half second engaging means and aligning said first outside body half second engaging means with said second outside body half first engaging means.

31. The method of claim 26 said splicer having at least two openings each associated with one of said at least two optical fibers, fiber receiving and positioning means extending between said at least two openings, said double cantilever spring means clamping both of said at least two fibers when each one of said fibers are introduced in said fiber receiving and positioning means from said associated one of said at least two openings to a point in said splicer which is about halfway between said at least two openings, said clamping for each of said at least two fibers being independent of each other, said method further comprising the steps of:

e) forcing double cantilever spring means to deflect between one of said at least two openings and said about halfway point; and f) moving said associated one of said at least two optical fibers in said fiber receiving and positioning means.

32. The method of claim 31 wherein said moving step is the inserting of said associated one of said at least two optical fibers in said fiber receiving and positioning means between said one opening and said about halfway point and said method further comprises the step of removing said deflecting force after said moving step.

33. The method of claim 31 wherein said associated one of said at least two optical fibers is in said fiber receiving and positioning means between said one opening and said about halfway point and said moving step is the removing of said one fiber and said method further comprises the step of removing said deflecting force after said moving step.

34. A splicer for at least two optical fibers comprising: a housing having at least two openings each associated with one of said at least two optical fibers and at least one double cantilever spring means; fiber receiving and positioning means in said housing extending between said at least two openings, said at least one double cantilever spring means clamping both of said at least two fibers when each one of said fibers are introduced in said fiber receiving and positioning means from said associated one of said at least two openings to a point in said housing which is about halfway between said at least two openings, and wherein said clamping for each of said at least two fibers is independent of each other; flexible splice element means centrally located in said housing, said fiber receiving and positioning means also passing through said splice element means such that said about halfway point is about in the middle of said fiber receiving and positioning means in said splice element means; means for deflecting both a part of said at least one double cantilever spring means and said splice element means so that a fiber can be moved in said fiber receiving and positioning means from one of said openings to said about halfway point; said deflecting means comprising tool receiving means in said housing extending between said at least two openings and also passing through said splice element means, said part of said at least one double cantilever spring means and said splice element means being deflected when a a tool is inserted into said tool receiving means and said tool is moved in a predetermined direction; wherein said housing includes means for ensuring an intimate contact between said splice element means and said housing so that when said tool is inserted in said tool receiving means a predetermined movement of said tool will cause a predetermined deflection of said at least one double cantilever spring means; and wherein said intimate contact means are fabricated from a material which partially melts when said splicer is subjected to ultrasonic or other heating means upon assembly.

* * * * *

UNITED STATES PATENT AND TRADEMARK OFFICE
CERTIFICATE OF CORRECTION

PATENT NO. : 5,121,456

DATED : June 9, 1992

INVENTOR(S) : Robert Essert and Peter Ori

It is certified that error appears in the above-identified patent and that said Letters Patent is hereby corrected as shown below:

Column 9, Line 42 "It should be appreciated that each end of splicer may" should be -- It should be appreciated that each end of splicer 10 may --

Column 11, lines 21-22, "Referring now to Fig. 5b there is shown splicer Fig. wherein" should read --Referring now to Fig. 5b there is shown splicer 10 of Fig. 1 wherein--.

Column 19, Line 10 "opening sand said second opening, said spring means" should be --opening and said second opening, said spring means --

Column 19, Line 25 "means between one of said at least two openings and" should be --means between one of said at least two openings and --

Column 20, line 63, "splicer comprise splice element having first and second" should read --splicer comprising a splice element having first and second--.

Column 21, Line 8 "body halves has means or" should be --body halves has means for --

Column 21, Line 10 "first and second ice element" should be --first and second splice element --

Column 21, Line 36 "halves engaging me with each other" should be --halves engaging means with each other --

UNITED STATES PATENT AND TRADEMARK OFFICE
CERTIFICATE OF CORRECTION

PATENT NO.  : 5,121,456

DATED       : June 9, 1992

INVENTOR(S) : Robert Essert and Peter Ori

It is certified that error appears in the above-identified patent and that said Letters Patent is hereby corrected as shown below:

Column 22, Line 49 " element means being deflected when a..a tool is inserted " should be -- element means being deflected when a tool is inserted --

Signed and Sealed this

Fifth Day of October, 1993

*Attest:*

BRUCE LEHMAN

*Attesting Officer*   *Commissioner of Patents and Trademarks*